July 31, 1962  B. KOSCHELEFF  3,047,846
ELECTRO-MAGNETIC POSITION TRANSMITTER
Filed Feb. 17, 1958
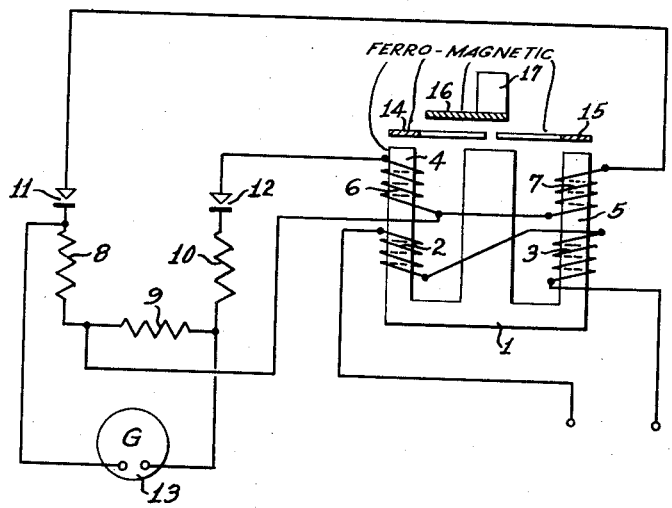
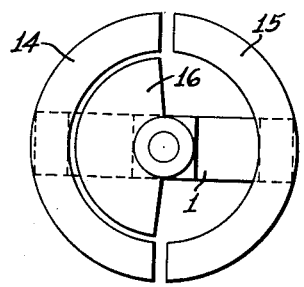
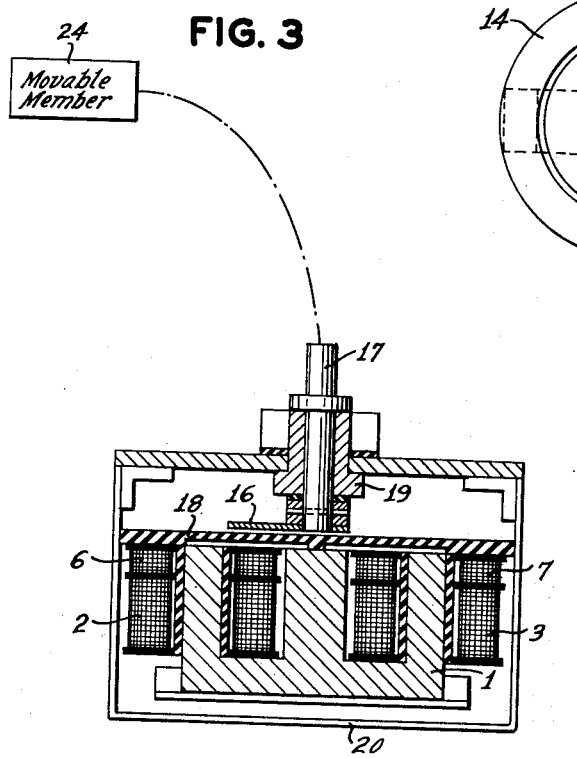
INVENTOR.
Basile Koscheleff
ATTORNEYS

United States Patent Office 3,047,846
Patented July 31, 1962

3,047,846
ELECTRO-MAGNETIC POSITION TRANSMITTER
Basile Koscheleff, 59 Rue Boileau, Paris, France, assignor of one-half to Nicholas John Katenov, Long Island City, N.Y.
Filed Feb. 17, 1958, Ser. No. 715,610
2 Claims. (Cl. 340—199)

The subject of the present invention is an electro-magnetic device which electrically transmits to remote points indications of the position of a physical body or member.

In accordance with the invention there is provided an electro-magnetic device for electrically transmitting the position of a physical member. The electro-magnetic device includes a pair of magnetic flux paths having substantially identical permeability characteristics. Means, adaptable for being connected to the member and movable thereby, is provided for simultaneously increasing the total permeability of one path while decreasing the total permeability of the other. The electro-magnetic device also includes primary coil means for developing a magnetic field in each path in proportion to the total permeability of the path. Secondary coil means are included in each path for developing an output signal proportional to the magnitude of the magnetic field in the path. The positioning transmitter further includes a circuit for determining the difference between the output signals and means utilizing the difference as a representation of the position of the member.

It is an object of the invention to provide a new and novel electro-magnetic position transmitter for remotely indicating or controlling the position of a physical member by means of an electrical signal.

It is also an object of the invention to provide a new and novel electro-magnetic positioning transmitter which is simple to construct and inexpensive to operate.

It is a further object of the invention to provide a new and novel electro-magnetic positioning transmitter which is free of electrical contacts and contains only one moving part.

The above and other objects, features, and advantages of the invention will be more fully understood from the following description considered in connection with the accompanying illustrative drawings.

Referring now to the drawings which illustrate the best mode presently contemplated of carrying out the invention:

FIG. 1 is a circuit diagram partly schematic of an electro-magnetic positioning indicator embodying the present invention in a particular form;

FIG. 2 is a top plan view of a representative magnetic core structure; and

FIG. 3 is a sectional view of a representative coil and core assembly showing means for attaching the electro-magnetic device to a movable member.

Referring to FIG. 1, there is represented a circuit diagram of an electro-magnetic positioning indicator. The indicator comprises a three-branch E-shaped magnetic core 1, constructed from ferro-magnetic sheets or other suitable para-magnetic substances. Core 1 includes two exterior branches 4 and 5. Elements 2 and 3 are two coils which constitute the primary circuit for energizing the device. Coils 2 and 3 are adaptable for being energized by an alternating electrical current of any frequency. The coils 2 and 3 are electrically and magnetically connected in series and in opposition for developing magnetic polarities of opposite sign at the ends of the two exterior branches 4 and 5 of the magnetic core 1. For example, if at any moment the end of branch 4 is a north pole the end of branch 5 will be a south pole, during that same moment.

Coils 6 and 7 comprise a secondary circuit and are connected in series in opposition to their induced voltages. Coil 7 delivers a current, rectified by the diode 11, to the resistance 8. The coil 6 similarly feeds the two resistances 9 and 10, assembled in series through the diode 12. The difference of potential which appears between resistances 8 and 9 is delivered to the direct current galvanometer 13, which displays a deviation as a function of that voltage.

The element 16 of ferro-magnetic metal, is preferably semi-circular in shape or may be of any other suitable shape according to the particular application, and confronts the free ends of the legs of the core and is movable between the branches 4 and 5 of the core 1, by rotating axle 17. Rotation of axle 17 moves element 16 in relation to the parts of the core 1 for increasing the permeability of one of the magnetic circuits through branch 4 or 5 and simultaneously decreasing the permeability of the magnetic circuit through the other branch. As illustrated in FIG. 3 axle 17 is mechanically connected to movable member 24, the movable member 24 representing a physical body or member whose position is to be indicated. Linear movement can also be realized by conveniently modifying the mechanical transmission system. The two half-washers 14 and 15 of ferro-magnetic metal, acting as magnetic pole pieces, are set between the element 16 and the core 1. The purpose of those elements is to assure a better distribution of the lines of magnetic flux, thus facilitating the shaping of the element 16. The top plan view, FIGURE 2, shows the position of the element 16 in relation to the elements 14 and 15 and the magnetic core 1.

The operation of the electro-magnetic position transmitter, giving a better comprehension of the spirit of the invention, is as follows. Element 16, controlled from movable member 24 through axle 17, moves between the branches 4 and 5 of the magnetic core 1 by describing a semi-circle. When for instance, it is positioned over the branch 4, the total permeability of the magnetic circuit of that branch reaches a peak. The voltage at the terminals of primary coil 2 also reaches a peak as a result of an increase in its impedance accompanying the increase in permeability of branch 4. The voltage induced in the secondary coil 6 also increases by following the variations of the coil 2 voltage. During this time, permeability of the magnetic circuit of branch 5, as well as the voltage induced in the coil 7, pass through a minimum. The above described effect is reversed when the element 16 is positioned over branch 5.

The voltages produced in the secondary coils 6 and 7, as a result of the variation of the magnetic permeability are added to the voltages induced in these coils in the absence of the ferro-magnetic element 16. These normally induced voltages bias the rectifiers above the lower bend portion of their characteristic curve and allow the use of the rectifiers 11 and 12 in the rectilinear portion of their characteristic curve.

The rectified voltage which appears at the outlet of the rectifiers 11 and 12, at the terminals of resistances 8 and 10, is the algebraic sum, or numerical difference, of the voltages induced in the secondaries 6 and 7. As those voltages are in opposition, without displacement of element 16, their sum is zero there being at the moment a numerical equality of their values.

By varying, through the rotation of axle 17, the position of the element 16 in relation to the branches 4 and 5, the voltage at the terminals of the galvanometer 13 may be made to vary between two limits, positive and negative, by way of zero. The nil or zero voltage corresponds to a well determined position of the element 16 and that position can be pre-established in advance, by a judicious selection of the value of the resistance 10.

The relation between the angular displacement of the element 16 and the graduation of the galvanometer 13 can be made to follow any law desirable, by appropriately shaping element 16.

By way of an example, and not of limitation, the FIGURE 3 sectional view represents a practical construction of the instrument. The spools 2, 3, 6 and 7 are placed on the outer branches 4 and 5 of the magnetic core 1 where they are maintained in position by the insulating plate 18. The electric capacity between the primary and the secondary coils is reduced to the minimum by the very arrangement of those coils. The axle 17 fixed to the element 16, can turn freely within its socket 19. Connection with the organ to be controlled, movable member 24, is made at the end of axle 17 opposite to the element 16. The instrument as a whole is protected against harmful outside magnetic influences, by the cover 20 of ferro-magnetic metal. Resistances 8, 9 and 10 and the rectifiers 11 and 12 can be housed under the same cover 20 if desired.

The electro-magnetic positioning transmitter can be used for remotely controlling the angular or linear displacement of some body or machinery working parts. The instrument can also be adapted as a gauge for controlling the pressure of gases or of liquids. In the former case the difference signal is amplified and coupled to a suitable control mechanism. In the latter case, the ferromagnetic element 16 can be constructed in the form of a tongue, controlled linearly by a diaphragm. The length of that tongue will be slightly shorter than the internal distance of the branches 4 and 5, to obtain the maximum amplification.

While I have shown and described the preferred embodiment of my invention, it will be understood that various changes may be made in the idea or principles of the invention within the scope of the appended claims.

Having thus described my invention, what I claim and desire to secure by Letters Patent, is:

1. In an electro-magnetic device for electrically transmitting the position of a member, an E-shaped magnetic core having two laterally spaced legs and an intermediate leg between said laterally spaced legs defining a pair of magnetic flow paths having substantially identical permeability characteristics, one of said magnetic flow paths comprising one of said lateral legs and said intermediate leg and the other of said magnetic flow paths comprising the other of said lateral legs and said intermediate leg, companion primary and secondary electric circuit windings encircling each of said laterally spaced legs only, said intermediate leg being devoid of an electric winding thereon but providing part of each of said magnetic paths, said primary windings being connected in series circuit relation and wound in opposite directions on the companion leg of said core, and said secondary windings being connected in series circuit relation and wound in opposite directions on the companion leg of said core, said primary winding and said secondary winding on one of said laterally spaced legs being wound in one direction on said one leg and said primary winding and said secondary winding on the other of said laterally spaced legs being wound on said other leg in a direction opposite to said one direction, and a magnetic permeable member positioned adjacent the free ends of the three legs of said E-shaped core and mounted for rotary movement relative to said free ends of said legs of said core about an axis parallel to said legs to positions closer to said end of one of said lateral legs than to said end of said other lateral leg for increasing the permeability of one of said magnetic paths and decreasing the permeability of the other of said magnetic paths, a circuit for determining the difference between the output signals of said secondary windings, and means operable in accordance with said difference to indicate the position of said movable permeable means.

2. In an electro-magnetic device for electrically transmitting the position of a member, an E-shaped magnetic core having two laterally spaced legs and an intermediate leg between said laterally spaced legs defining a pair of magnetic flow paths having substantially identical permeability characteristics, one of said magnetic flow paths comprising one of said lateral legs and said intermediate leg and the other of said magnetic flow paths comprising the other of said lateral legs and said intermediate leg, companion primary and secondary electric circuit windings encircling each of said laterally spaced legs only, said intermediate leg being devoid of an electric winding thereon but providing part of each of said magnetic paths, said primary windings being connected in series circuit relation and wound in opposite directions on the companion leg of said core, and said secondary windings being connected in series circuit relation and wound in opposite directions on the companion leg of said core, said primary winding and said secondary winding on one of said laterally spaced legs being wound in one direction on said one leg and said primary winding and said secondary winding on the other of said laterally spaced legs being wound on said other leg in a direction opposite to said one direction, arcuate pole pieces at the free ends of said lateral legs, respectively, and a magnetic permeable member positioned adjacent said arcuate pole pieces and mounted for rotary movement relative to said pole pieces about an axis parallel to said legs to positions closer to one of said pole pieces than to the other of said pole pieces for increasing the permeability of one of said magnetic paths and decreasing the permeability of the other of said magnetic paths, a circuit for determining the difference between the output signals of said secondary windings, and means operable in accordance with said difference to indicate the position of said movable permeable means.

References Cited in the file of this patent

UNITED STATES PATENTS

| 2,408,524 | Mestas | Oct. 1, 1946 |
| 2,467,582 | Corkran | Apr. 19, 1949 |
| 2,494,493 | Schaevitz | Jan. 10, 1950 |
| 2,558,184 | Lavet | June 26, 1951 |
| 2,853,878 | Anderston et al. | Sept. 30, 1958 |

FOREIGN PATENTS

| 754,130 | France | Nov. 2, 1933 |

OTHER REFERENCES

"Servomechanism Analysis," by G. J. Thaler et al., McGraw-Hill, 1953.